US012288472B2

(12) United States Patent
Gonzalez (10) Patent No.: US 12,288,472 B2
(45) Date of Patent: Apr. 29, 2025

(54) MUSIC TEACHING DEVICE FOR INSTRUCTION IN DRUMMING AND RELATED MUSICAL SKILLS AND METHODS OF USE

(71) Applicant: Alejandro A. Gonzalez, Round Rock, TX (US)

(72) Inventor: Alejandro A. Gonzalez, Round Rock, TX (US)

(*) Notice: Subject to any disclaimer, the term of this patent is extended or adjusted under 35 U.S.C. 154(b) by 107 days.

(21) Appl. No.: 18/227,518

(22) Filed: Jul. 28, 2023

(65) Prior Publication Data

US 2024/0038091 A1 Feb. 1, 2024

Related U.S. Application Data

(60) Provisional application No. 63/392,928, filed on Jul. 28, 2022.

(51) Int. Cl.
| | | |
|---|---|---|
| G09B 15/02 | (2006.01) | |
| G10D 13/03 | (2020.01) | |
| G10G 1/00 | (2006.01) | |

(52) U.S. Cl.
CPC ........... G09B 15/026 (2013.01); G10D 13/03 (2020.02); G10G 1/00 (2013.01)

(58) Field of Classification Search
CPC ......... G09B 15/026; G10D 13/03; G10G 1/00
See application file for complete search history.

(56) References Cited

U.S. PATENT DOCUMENTS

| 1,346,588 | A | * | 7/1920 | Bower | ................... | G10D 13/03 |
| | | | | | | 984/151 |
| 4,102,235 | A | | 7/1978 | Le Masters | | |
| 4,179,974 | A | * | 12/1979 | Trankle | .................. | G10D 13/03 |
| | | | | | | 984/150 |

(Continued)

FOREIGN PATENT DOCUMENTS

| CN | 2320105 Y | 5/1999 |
| CN | 2632787 Y | 8/2004 |

(Continued)

OTHER PUBLICATIONS

One Beat Better; One Beat Better—Timbre Jam—Maple—Low Pitch; https://onebeatbetter.com/collections/frontpage/products/timbre-jam-percussion-instrument-and-practice-pad.

(Continued)

*Primary Examiner* — Robert W Horn
(74) *Attorney, Agent, or Firm* — HULSEY P.C.

(57) ABSTRACT

A foldable music teaching device is disclosed. The music teaching device includes a plate. The plate includes a first plate, a second plate, and a third plate. The second plate comes in a rectangular configuration and acts as a center plate of the plate. Each of the first plate and the third plate comes in a semi-circular configuration and connects at either side of the second plate. Each of the first plate, the second plate, and the third plate includes zones for receiving magnetic pads. The plate includes legs/supports. The legs/supports help to position the plate at a height from the ground. The second plate presents a hinge plate. The hinge plate allows to position music notes over the second plate such that users stand surrounding the plate. The users view the music notes and use musical instruments to produce sound by hitting the musical instruments over the magnetic pads.

20 Claims, 9 Drawing Sheets

(56) References Cited

U.S. PATENT DOCUMENTS

| | | | | |
|---|---|---|---|---|
| 5,115,706 | A | * | 5/1992 | Aluisi .................. G10H 1/32 84/DIG. 12 |
| D359,978 | S | | 7/1995 | Eagle |
| 5,520,090 | A | * | 5/1996 | Eagle .................. G10D 13/03 84/422.4 |
| 5,801,320 | A | * | 9/1998 | Segan .................. G10H 1/32 84/738 |
| 5,929,354 | A | | 7/1999 | Davis |
| 6,063,992 | A | * | 5/2000 | Schwagerl ........... G10D 13/03 84/411 R |
| 6,386,628 | B2 | | 5/2002 | Bue |
| D464,987 | S | * | 10/2002 | Edwards .................. D17/22 |
| D464,988 | S | * | 10/2002 | Edwards .................. D17/22 |
| 6,471,078 | B2 | | 10/2002 | Pyle |
| 6,525,259 | B2 | | 2/2003 | Sagastegui |
| 7,348,479 | B1 | | 3/2008 | Lombardi |
| 8,367,916 | B2 | | 2/2013 | May |
| 9,257,107 | B1 | | 2/2016 | Belli et al. |
| 9,583,083 | B1 | | 2/2017 | Berlinger |
| 9,837,062 | B2 | | 12/2017 | Wernick et al. |
| 10,217,446 | B2 | | 2/2019 | Broadbelt |
| 10,304,429 | B1 | | 5/2019 | Broadbelt |
| 10,896,662 | B2 | | 1/2021 | Wish |
| 10,916,227 | B1 | | 2/2021 | Yeates |
| 11,295,710 | B1 | | 4/2022 | Gakki |
| 11,315,531 | B1 | * | 4/2022 | Tuk .................. G10D 13/24 |
| 2007/0256537 | A1 | | 11/2007 | de los Reyes |
| 2008/0115653 | A1 | | 5/2008 | Sagastegui |
| 2022/0068246 | A1 | | 3/2022 | Humphreys |
| 2024/0038091 | A1 | * | 2/2024 | Gonzalez ............... G10D 13/03 |

FOREIGN PATENT DOCUMENTS

| | | |
|---|---|---|
| CN | 202077812 U | 12/2011 |
| CN | 202396811 U | 8/2012 |
| CN | 203633723 U | 6/2014 |
| CN | 206252075 U | 6/2017 |
| CN | 112270852 A | 1/2021 |
| CN | 213183187 U | 5/2021 |
| CN | 112967564 A | 6/2021 |
| CN | 213428993 U | 6/2021 |
| CN | 213935277 U | 8/2021 |
| CN | 214043048 U | 8/2021 |
| CN | 215527226 U | 1/2022 |
| CN | 114333738 A | 4/2022 |
| KR | 1020120113304 A | 10/2012 |

OTHER PUBLICATIONS

One Beat Better; One Beat Better—Triple Mount Tray (Requires MMC-1); https://www.steveweissmusic.com/product/one-beat-better-triple-mount-tray/log-drums-temple-blocks.

Sensel; Sensel Morph Drum Pad Overlay; https://www.tanotis.com/products/sensel-morph-drum-pad-overlay?gclid=EAlalQobChMIwO-n5pyx9wIVI5ImAh0idQDzEAQYCCABEgIBSPD_BwE; (page no longer available).

RWM; Shake-Astick Round Music Table; https://www.rwomusic.com/product/shake-astick-round-music-table/.

* cited by examiner

MUSIC TEACHING DEVICE FOR INSTRUCTION IN DRUMMING AND RELATED MUSICAL SKILLS AND METHODS OF USE

RELATED APPLICATION

The present application claims priority to U.S. Provisional Patent Application Ser. No. 63/392,928, titled "MUSIC TEACHING DEVICE FOR INSTRUCTION IN DRUMMING AND METHODS OF USE", filed on Jul. 28, 2022, which is fully and completely incorporated by reference herein.

FIELD OF THE INVENTION

The present invention generally relates to musical instruments. More particularly, the present invention relates to a music teaching device that allows multiple users or students to read and play music simultaneously.

DESCRIPTION OF THE RELATED ART

It is known that there are various methods of teaching students to read and play music. There are a variety of musical instruments that are used for producing different sounds. The method of teaching to read and play music varies depending on the type of musical instrument that needs to be taught. For instance, musical instruments such as drum or percussion instruments are usually rhythmic in function and have tone or sound characteristics which are produced by a person or group of people. Typically, the person or group of people strike or shake the instrument(s) to produce sound.

In order to teach the drum or percussion instruments to the students, often music teachers provide a surface other than actual drum or percussion instruments for the students to practice. An example of such a surface includes a drum practice pad. The drum practice pad is designed to be placed at different places depending on the need. For example, the drum practice pad is designed for use on the playing head of a drum. In another example, the drum practice pad is placed over a support stand or a mounting surface adapted to be strapped around a drummer's leg.

Several devices have been disclosed in the past that incorporated the designs discussed above. One such example is disclosed in a U.S. Pat. No. 4,102,235, entitled "Drum practice pad" ("the '235 Patent"). The '235 Patent discloses a practice pad for a drum or similar percussion instrument of the type fabricated of a construction material having sound-muffling characteristics and used in a directly supported position on the playing head of the drum, in the use of which all auxiliary structure to hold the pad on the drum vibrating playing head, and thus keep it in place, is eliminated. This is done simply by the advantageous selection of an appropriate weight oil-tanned leather as the construction material for the pad. In use, this specifically selected material has the proper weight to dampen, and thus muffle the drum auditory output and, also, by its sheer weight maintains a flat, surface-to-surface contact with the vibrating drum playing head, thus obviating any need for appropriate clamps or other structural members which typically are attached to the drum and to the pad.

Another example is disclosed in a United States Publication No. 20220068246, entitled "Drum practice pad" ("the '246 Publication"). The '246 Publication discloses a practice pad for practicing the use of a snare drum. The practice pad includes: an upper drum surface; and a sound generating device arranged below the drum surface. The sound generating device includes: a chamber having a first surface and an opposing second surface; and a plurality of elongate rods retained inside the chamber, between the first and second surfaces, so that the plurality of elongate rods vibrate against the first and second surfaces in response to a strike of the drum surface.

Yet another example is disclosed in a U.S. Pat. No. 10,217,446, entitled "Percussion device" ("the '446 Patent"). The '446 Patent discloses a percussion device includes (1) a platform portion composed of a first material having an exposed striking portion composed of a second material different from the first material; (2) a base portion separated from, and substantially parallel to, the platform portion by a predetermined distance; (3) at least one unitary sidewall portion positioned between the platform portion and the base portion at respective opposing edges of the platform portion and the base portion; and (4) a non-flexible surface below, and in contact with, at least a portion of the exposed striking portion.

Although the disclosures presented above, and other similar disclosures that are known are useful for practicing or teaching music, they have several problems. For instance, the drum practice pads are connected individually to the user's leg, or over a supporting structure. As a result, they cannot be used for teaching or practicing music in a group. Further, the support stand used for placing the pad is not foldable and takes up considerable space when not in use.

Therefore, there is a need in the art to provide a music teaching device that allows multiple users or students to read and play music simultaneously.

SUMMARY

It is one of the main objects of the present subject matter to provide a music teaching device and that avoids the drawbacks of the prior art.

It is another object of the present subject matter to provide a music teaching device that allows multiple users or students to read and play music simultaneously.

It is another object of the present subject matter to provide a music teaching device having multiple playing zones in a circular fashion and a music stand at the centre to place music notes for the users to see from all the sides and play the music.

It is another object of the present subject matter to provide a music teaching device that is easily foldable when not in use.

In order to overcome the limitations here stated, the present subject matter provides a foldable music teaching device. The music teaching device includes a plate. The plate includes a first plate, a second plate, and a third plate. The second plate comes in a rectangular configuration and acts as a centre plate of the plate. Each of the first plate and the second plan comes in a semi-circular configuration and connects at either side of the second plate. Each of the first plate, the second plate, and the third plate includes zones for receiving magnetic pads. The plate includes legs. The legs removably connect to the plate and help to position the plate at a height from the ground.

The second plate presents a hinge plate. The hinge plate may include holes. Further, the second plate encompasses stoppers. The stoppers extend from the surface of the second plate. When not in use, the hinge plate folds and positions over the second plate such that the stopper(s) retain the hinge plate in place over the second plate. When needed, the hinge plate is disengaged from the stoppers and placed in an upright/standing position. The hinge plate is extended and placed in the upright/standing position such that the edges of the hinge plate are placed between the stoppers. Subsequently, the hinge plate receives music notes. Here, the music notes rest against the hinge plate such that the users surrounding the music teaching device may view the music notes from all sides. The users view the music notes and use musical instruments to produce sound by hitting the musical instruments over the magnetic pads.

The second plate includes hinges connecting the first plate and the third plate. The first plate and the third plate fold with the help of the hinges when not in use.

In one advantageous feature of the present subject matter, the foldable music teaching device acts as a roundtable for the users or students with the second plate acting as a centre table for placing the music notes. This allows teaching music to multiple users/students at a time. Playing in a group allows the users to develop team skills and learn to listen and non-verbally communicate with each other to create music.

In another advantageous feature of the present subject matter, the semi-circular first plate and third plate collapse and fold. This saves space when the music teaching device is not in use.

In another advantageous feature of the present subject matter, the users may stack two or more pads over one another. This helps to adjust the height of the pads for a particular user without changing the height of the plate/music teaching device for other users.

In yet another advantageous feature of the present subject matter, the hinge plate collapses and remains in positions over the second plate when not in use. When needed, the hinge plate extends and acts as a supporting stand for placing the music notes for the users to see from the sides of the first plate and the third plate.

Features and advantages of the subject matter hereof will become more apparent in light of the following detailed description of selected embodiments, as illustrated in the accompanying FIGUREs. As will be realized, the subject matter disclosed is capable of modifications in various respects, all without departing from the scope of the subject matter. Accordingly, the drawings and the description are to be regarded as illustrative in nature.

The second plate two may be supported by any structure containing wheels for easy mobility. For example, the second plate could be supported by a box on wheels or cabinet on wheels. The first plate and the third plate may be supported by wings attached to the plate one support. In one embodiment, the fully-open table may contain as few as 4 pads and as many as 16 pads. Note further that dimensions of the table may vary as small as 2 feet in diameter to as large as 8 feet in diameter.

BRIEF DESCRIPTION OF THE DRAWINGS

With the above and other related objects in view, the subject matter consists in the details of construction and combination of parts as will be more fully understood from the following description, when read in conjunction with the accompanying drawings in which.

DESCRIPTION OF THE EMBODIMENTS OF THE INVENTION

The following detailed description set forth below in connection with the appended drawings is intended as a description of exemplary embodiments in which the presently disclosed subject matter may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed music teaching device. However, it will be apparent to those skilled in the art that the presently disclosed subject matter may be practiced without these specific details. In some instances, well-known structures and devices are shown in functional or conceptual diagram form in order to avoid obscuring the concepts of the presently disclosed music teaching device.

In the present specification, an embodiment showing a singular component should not be considered limiting. Rather, the subject matter preferably encompasses other embodiments including a plurality of the same component, and vice versa, unless explicitly stated otherwise herein. Moreover, the applicant does not intend for any term in the specification to be ascribed an uncommon or special meaning unless explicitly set forth as such. Further, the present subject matter encompasses present and future known equivalents to the known components referred to herein by way of illustration.

Although the present subject matter provides a description of a music teaching device, it is to be further understood that numerous changes may arise in the details of the embodiments of the music teaching device. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

The present subject matter discloses a foldable music teaching device. The music teaching device includes a plate. The plate includes a first plate, a second plate, and a third plate. The second plate comes in a rectangular configuration and acts as a centre plate of the plate. Each of the first plate and the second plate comes in a semi-circular configuration and connects at either side of the second plate. Each of the first plate, the second plate, and the third plate includes zones for receiving magnetic pads. The plate includes legs or another support system. The legs/supports help to position the plate at a height from the ground. The second plate presents a hinge plate. The hinge plate allows users to position music notes over the second plate such that users stand surrounding the plate. The users view the music notes and use musical instruments to produce sound by hitting the musical instruments over the magnetic pads.

Various features and embodiments of a foldable music teaching device are explained in conjunction with the description of FIGS. 1-13.

Figure 1:
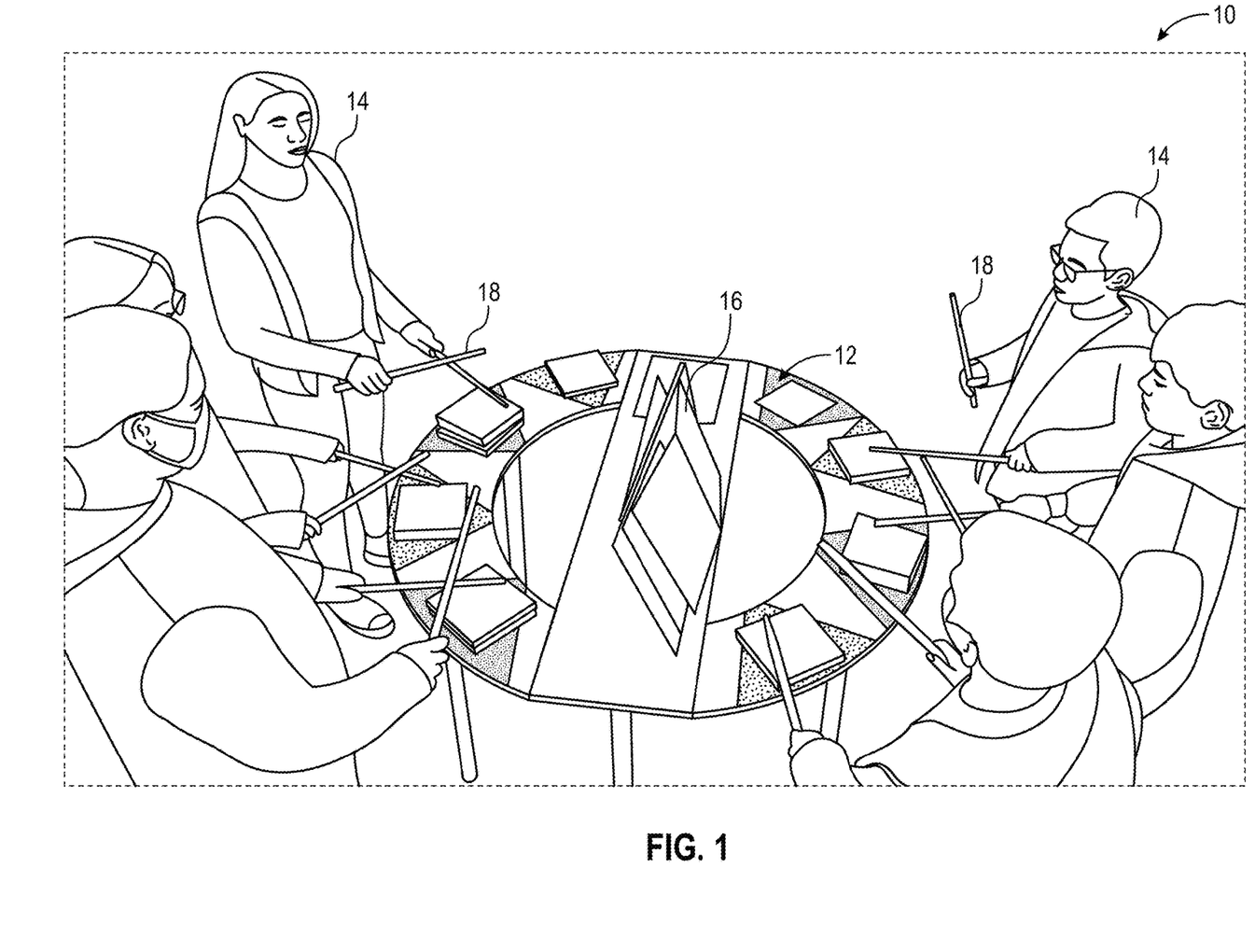
FIG. 1 illustrates an environment in which a foldable music teaching device implements, in accordance with one embodiment of the present subject matter.

Referring to FIG. 1, environment 10 in which a foldable music teaching device or music practice device or music teaching apparatus or music teaching apparatus 12 implements, in accordance with one embodiment of the present subject matter. Music teaching device 12 is used by one or more users 14 for practicing music. Here, one or more users 14 position in proximity to music teaching device 12 and view music notes or music sheets 16 placed over music teaching device 12 and practice music with the help of musical instrument 18. An example of musical instrument 18 includes, but not limited to, a percussion mallet or beater or drum stick or drum mallet. In the present subject matter, musical instrument 18 is used to strike or beat pads (i.e., pads placed over music teaching device 12 such as a percussion instrument) in order to produce sound. A music teacher (not shown) guides/teaches the music to one or more users 14 with the help of music notes 16.

Figure 2A:
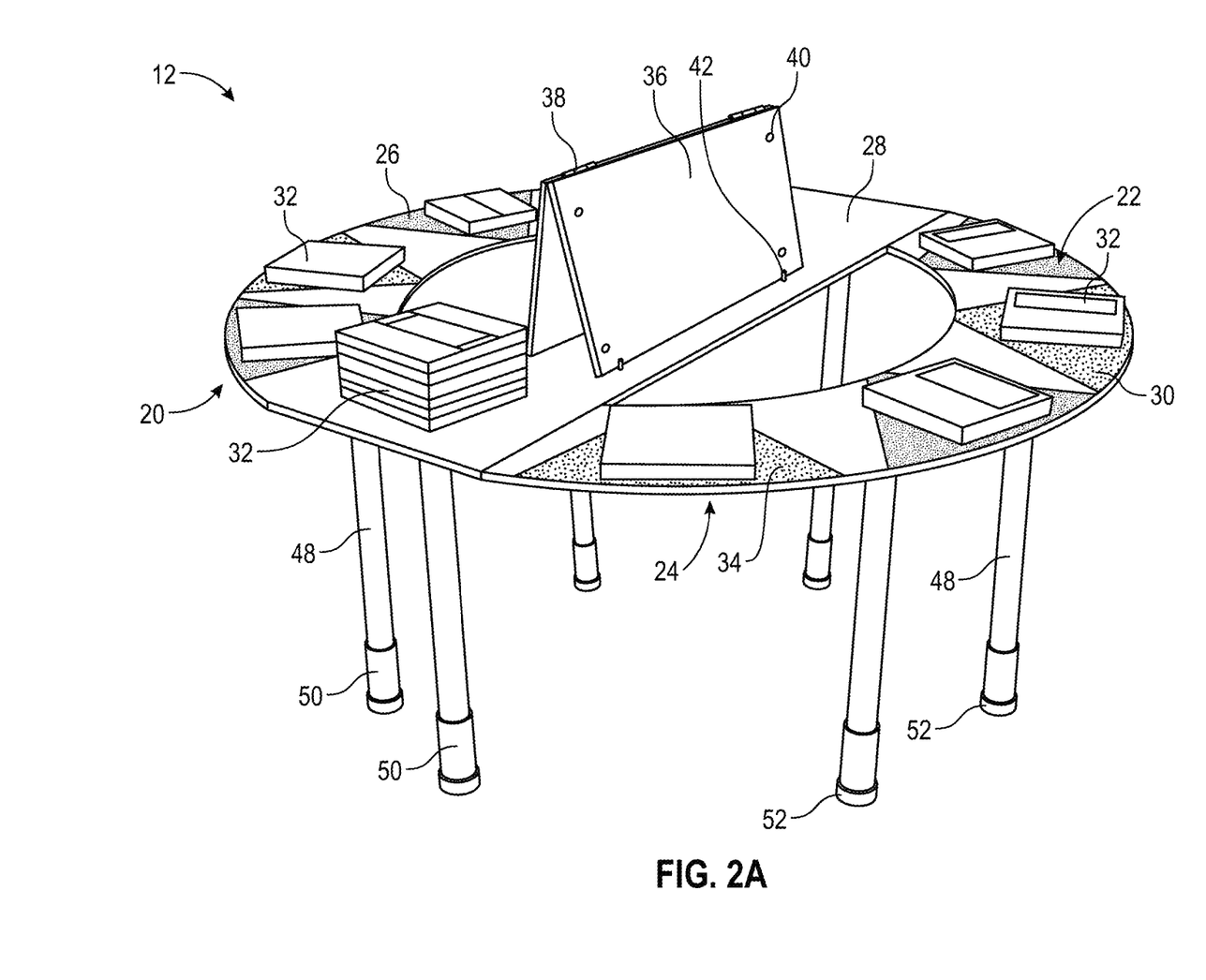
FIGS. 2A and 2B illustrate a perspective view and a top perspective view, respectively of the foldable music teaching device, in accordance with one embodiment of the present subject matter.
Figure 2B:
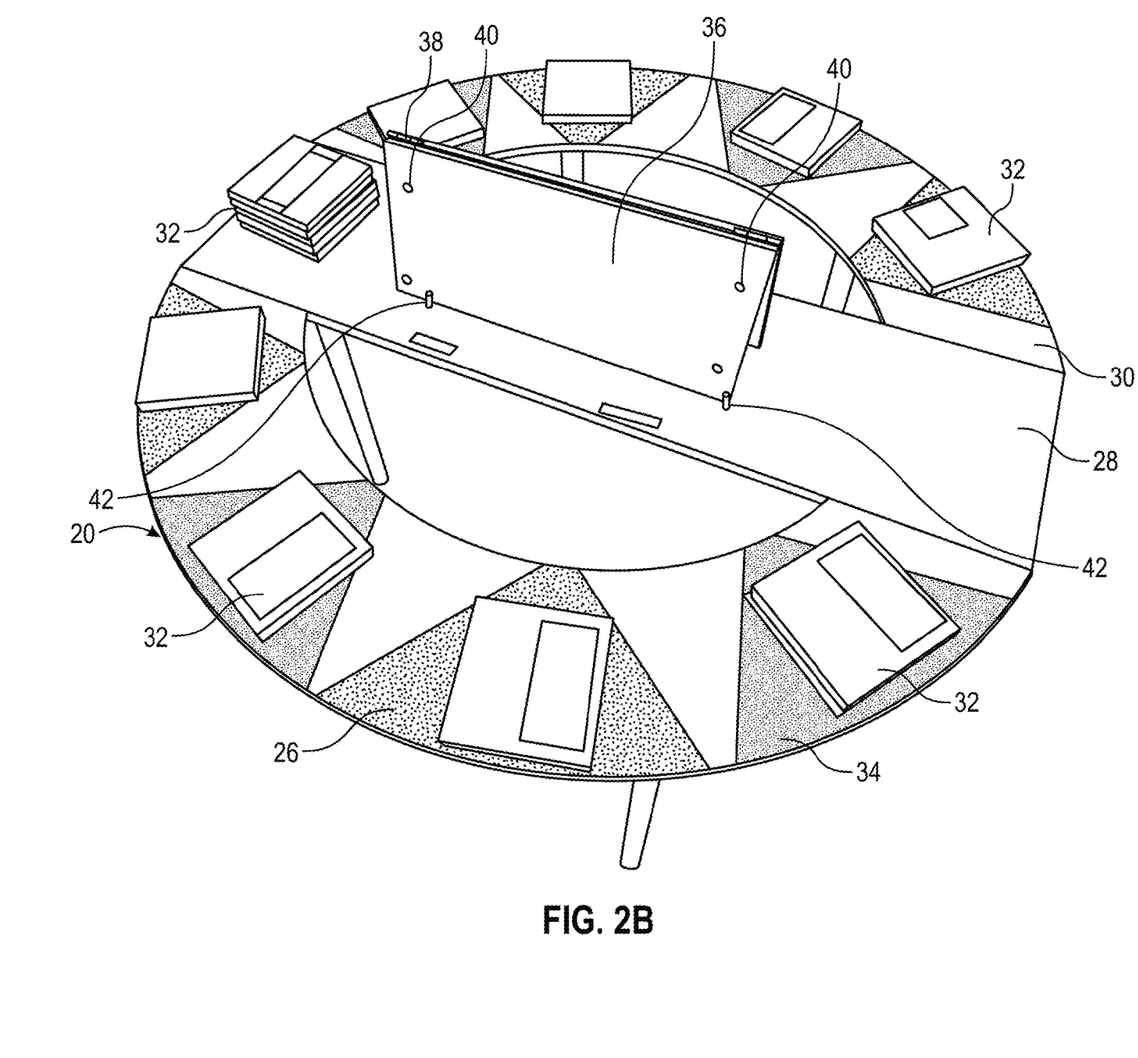

Music teaching device 12 acts as a table for placing music notes 16 and the pads for producing sounds. FIGS. 2A and 2B show a perspective view and a top perspective view, respectively of music teaching device 12, in accordance with one embodiment of the present subject matter. Music teaching device 12 includes a plate or work surface or table top 20. Plate 20 is made of metal, wood, plastic or any other suitable material. Plate 20 has a first side 22 and a second side 24. First side 22 indicates a top surface of plate 20. Second side 24 indicates a bottom surface of plate 20. Plate 20 includes a first plate 26, a second plate 28, and a third plate 30. First plate 26 presents a semi-circular plate. Second plate 28 presents a rectangular plate. Third plate 30 presents a semi-circular plate. As may be seen, second plate 28 positions between first plate 26 and third plate 30. When connected, first plate 26, second plate 28, and third plate 30 form a substantially circular configuration (with rectangular second plate 28 extending at the centre and acting as a centre table to put music notes 16 on both sides of it).

Figure 3:
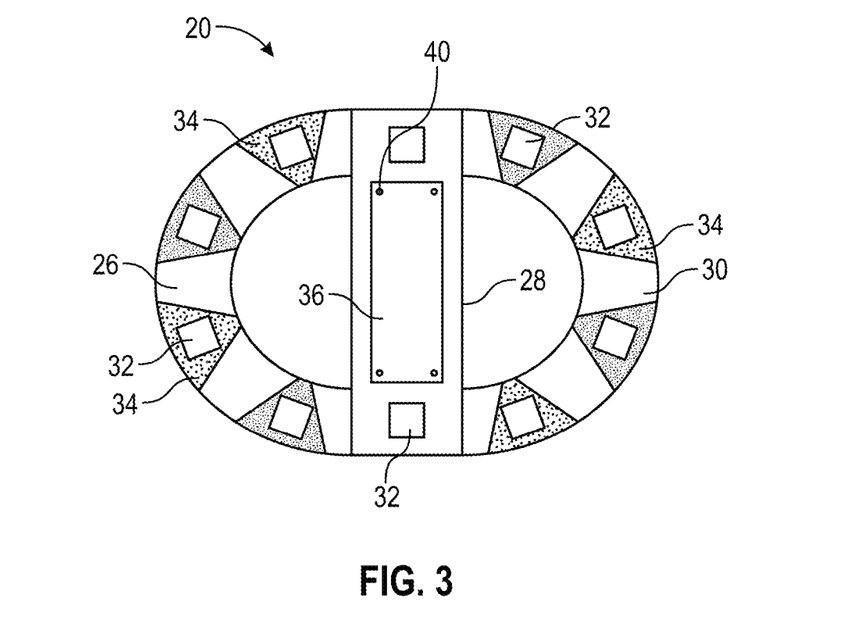
FIGS. 3 and 4 illustrate a top view and a bottom view, respectively of a plate, in accordance with one embodiment of the present subject matter.
Figure 4:
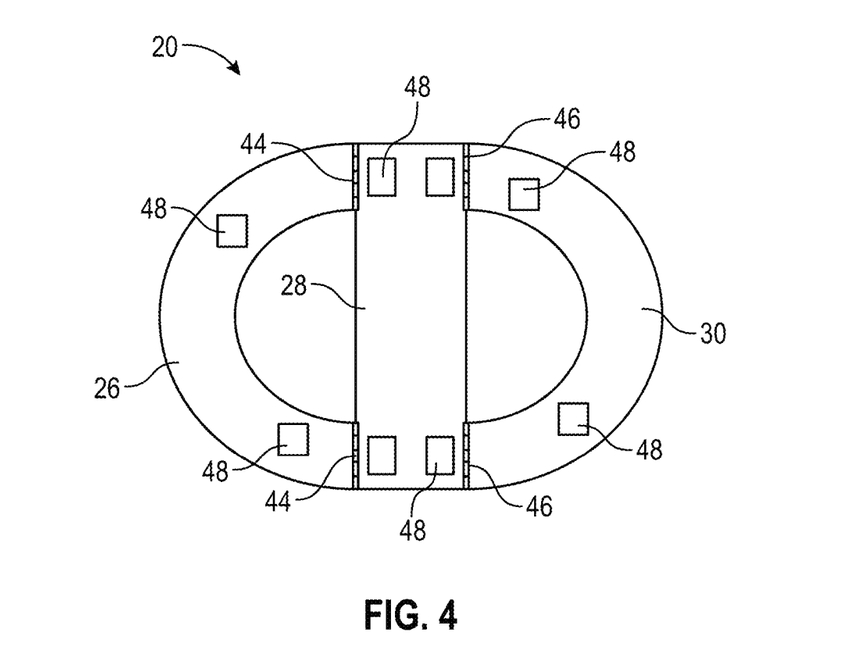

FIGS. 3 and 4 show a top view and a bottom view, respectively of plate 20, in accordance with one embodiment of the present subject matter. At first side 22, each of first plate 26, second plate 28 and third plate 30 includes a plurality of magnetic pads or pads or drum pads or drumstick practice pad 32. Pads 32 comes in rectangular, square or any other configuration. Pads 32 have suitable thickness. Pads 32 are made of the same or different material. For example, pad 32 provides a material such as poplar wood, maple wood, oak wood, hickory wood, rosewood, plastic, rubber or a combination thereof. In one example, pad 32 has a resilient surface coated/made of soft plastic, rubber or any other suitable material. The material for pad 32 is selected depending on the pitch needed to be produced by pad 32. In one example, pad 32 has a magnetic strip (not shown) at one side and has a wooden surface at another side. The magnetic strip allows pad 32 to connect to first plate 26, second plate 28 or third plate 30. Optionally, the base of pad 32 is provided with a magnetic surface/base for easily connecting to first plate 26, second plate 28 and third plate 30. Alternatively, pads 32 are removably connected to first plate 26, second plate 28 or third plate 30 using hook and loops, fasteners, adhesive or other known connecting mechanisms.

Figure 5:
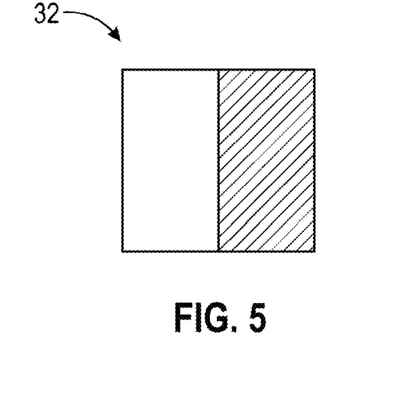
FIGS. 5 through 10 illustrate a variety of designs of magnetic pads, in accordance with one embodiment of the present subject matter.
Figure 6:
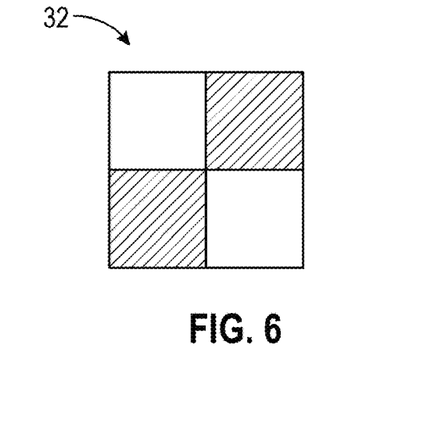
Figure 7:
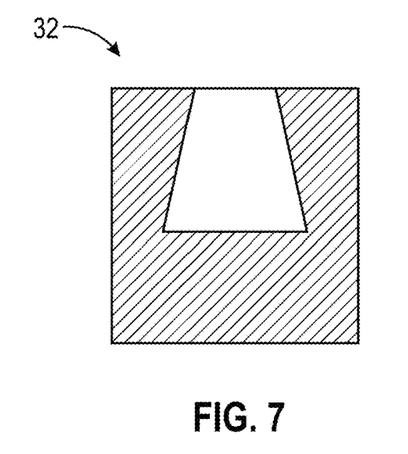
Figure 8:
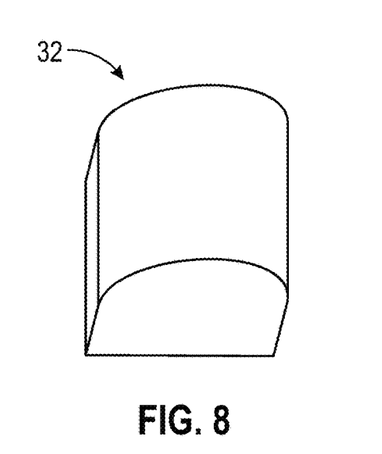
Figure 9:
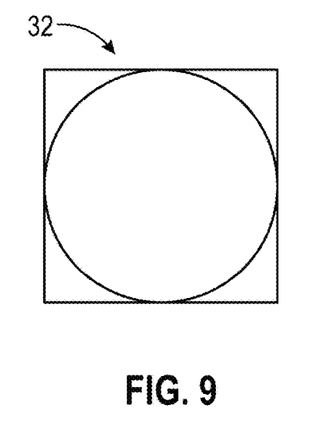
Figure 10:
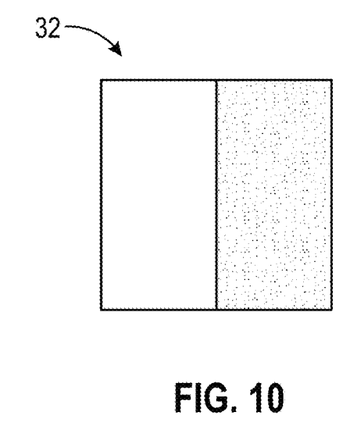

Pads 32 are provided in a variety of designs. FIGS. 5 through 10 show a variety of designs of pads 32, in accordance with one exemplary embodiment of the present subject matter. FIG. 5 shows pad 32 having a laminate section at one side, while the other side is provided in a plain configuration. FIG. 6 shows pad 32 having laminate sections at diagonally opposite sides. FIG. 7 shows pad 32 having a custom shape/logo design. FIG. 8 shows pad 32 in a pitched woodblock configuration. FIG. 9 shows pad 32 having a drum head with metal hoops. FIG. 10 shows pad 32 having two different materials. Pad 32 may come in any thickness and have hollow cavities that create different pitches when struck.

Pads 32 are placed over first plate 26, second plate 28 and third plate 30 depending on the need. As may be seen from FIGS. 2A, 2B and 3, plurality of magnetic pads 32 is placed at predefined zones 34 marked over each of first plate 26 and third plate 30. Optionally, zones 34 are marked over second plate 28. Zones 34 indicate an area for positioning or placing plurality of magnetic pads 32. For instance, zones 34 indicate angle reminders for placement of pads 32 for each user 14. In other words, zones 34 indicate playing zones for one or more users 14 to position and practice music. In one example, zones 34 have a magnetic surface and allow pads 32 to be easily connected over first plate 26, second plate 28 and third plate 30. Zones 34 are marked strategically to allow two or more users 14 to stand such that they are able to view music notes 16 placed over second plate 28 and practice the music. In one embodiment, two or more pads 32 are stacked and placed over first plate 26, second plate 28 and third plate 30. For instance, two or more pads 32 are stacked over second plate 28. When needed, a pad 32 is removed and placed at zone 34 at first plate 26, for example depending on the need. Optionally, two or more pads 32 are stacked at zones 34 over first plate 26 and third plate 30 to produce different sounds. In another example, all pads 32 are placed over second plate 28 in order to fold first plate 26 and/or third plate 30. In another example, users 14 stack two or more pads 32 over one another. This helps to adjust the height of pads 32 for a particular user 14 without changing the height of plate 20 or music teaching device 12 for other users 14.

Figure 11:
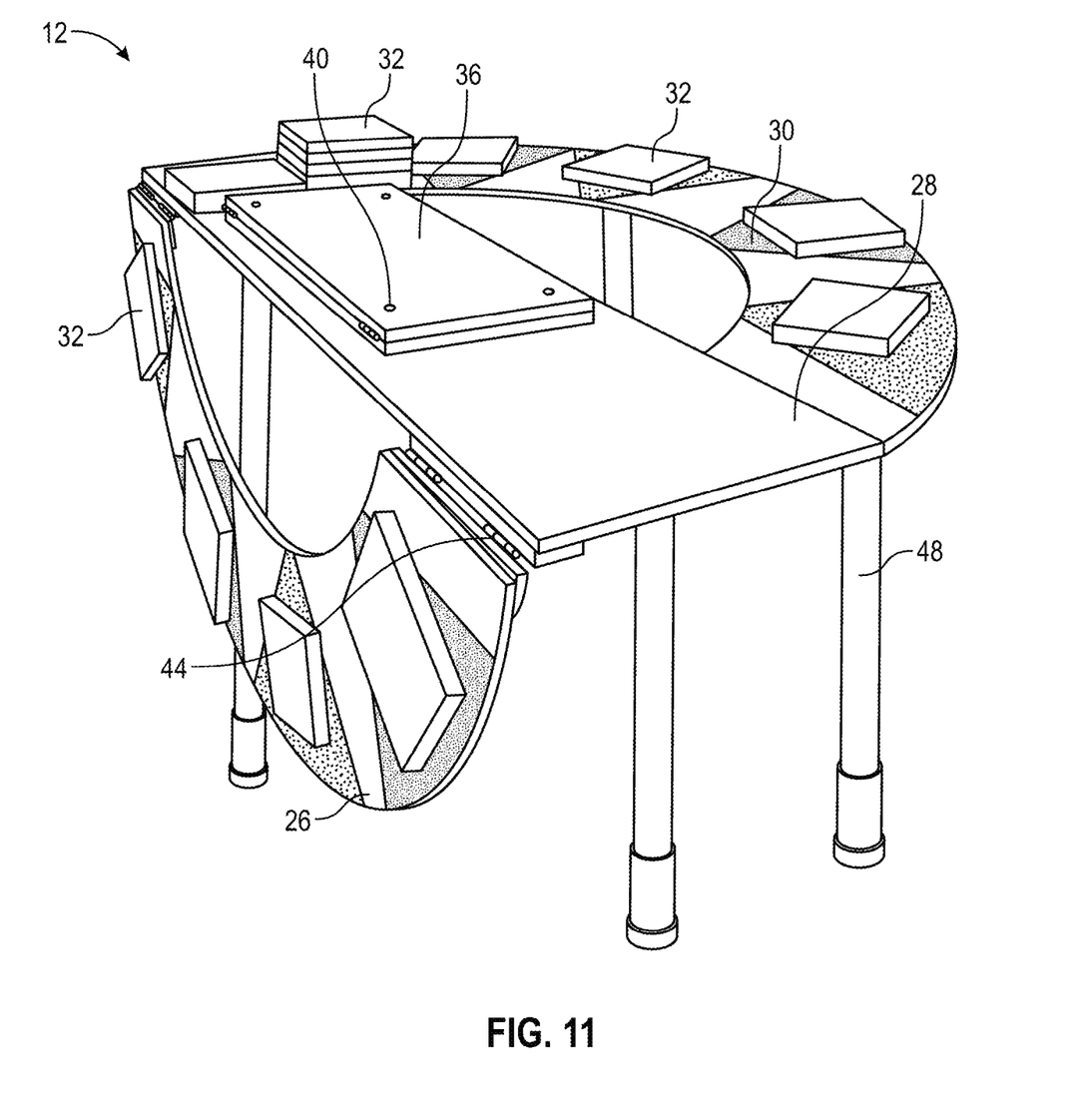
FIGS. 11 through 13 illustrate operational features of the foldable music teaching device, in accordance with one embodiment of the present subject matter.

Further, second plate 28 includes a hinge plate 36. As may be seen from at least FIGS. 2A and 2B, hinge plate 36 positions over second plate 28. Hinge plate 36 includes two plates, each having a rectangular or square configuration adjoined by a hinge 38. Hinge plate 36 is made of metal, wood, plastic or any other suitable material. Hinge plate 36 is foldable at hinge 38. In accordance with one embodiment, hinge plate 36 includes holes 40 present adjacent to the sides or edges of hinge plate 36. In one example, holes 40 position in a rectangular configuration. However, a person skilled in the art understands that more holes 40 may be positioned in different configurations without deviating from the scope of the present subject matter. Second plate 28 includes stoppers 42. Stoppers 42 indicate ridges that extend from the surface of second plate 28. Stoppers 42 come in cylindrical or rectangular or tapered configuration. Stoppers 42 configure to fit within holes 40. When not in use, hinge plate 36 folds and positions over second plate 28, as shown in FIG. 11, for example. Here, holes 40 receive stoppers 42 such that hinge plate 36 remains in position over second plate 28. When needed, hinge plate 36 is extended and placed in an upright/standing position such that the edges of hinge plate 36 are placed between stoppers 42 to retain hinge plate 36 in the upright/standing position. Hinge plate 36 provides an angled surface to place music notes 16 at both sides for one or more users 14 to see and practice the music standing near first plate 26 and third plate 30, as shown in FIG. 1, for example.

FIG. 4 shows a bottom view of plate 20. As may be seen, second plate 28 includes first hinges 44 and second hinges 46. First hinges 44 connect second plate 28 to first plate 26. First hinges 44 help first plate 26 rotate or swing towards second side 24 as shown in FIG. 11, for example. Similarly, second hinges 46 connect second plate 28 to third plate 30. Second hinges 46 help third plate 30 rotate or swing towards second side 24. A person skilled in the art understands that when first plate 26 (or third plate 30) rotates or swings towards second side 24, second plate 28 positions at substantially 90 degrees to first plate 26 (or third plate 30).

Further, plate 20 includes height adjustable legs 48. Legs 48 removably connect to each of first plate 26, second plate 28 and third plate 30 at second side 24. Legs 48 extend from second side 24 and help to position plate 20 at a suitable height from the ground, as shown in FIGS. 1 and 2, for example. In one example, legs 48 include sleeves 50 at distal ends facing the ground. Further, legs 48 include flexible members 52 made of rubber or any other suitable material. Flexible members 52 prevent damage to the ground when legs 48 come in contact with the ground.

Figure 12:
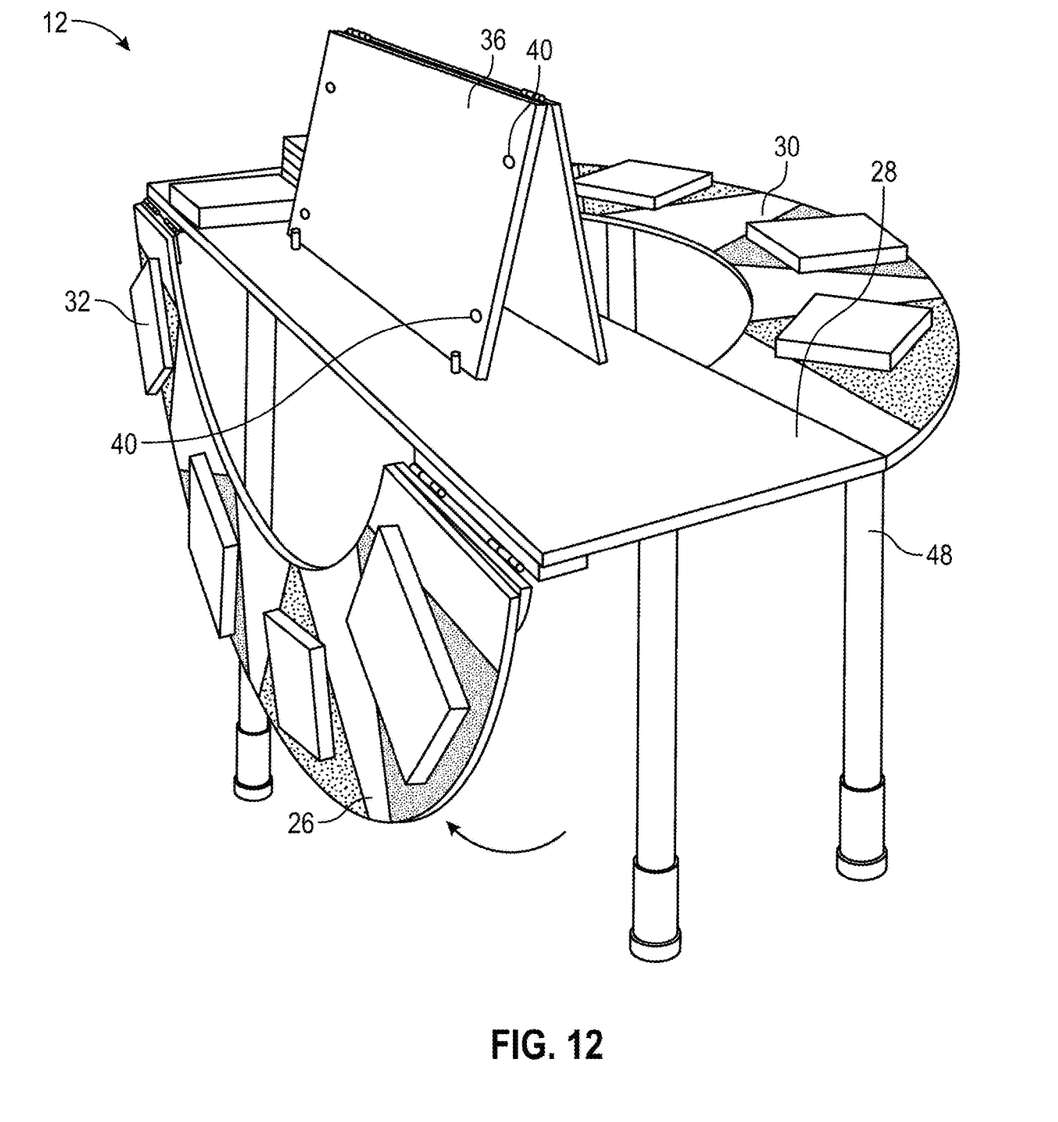
Figure 13:
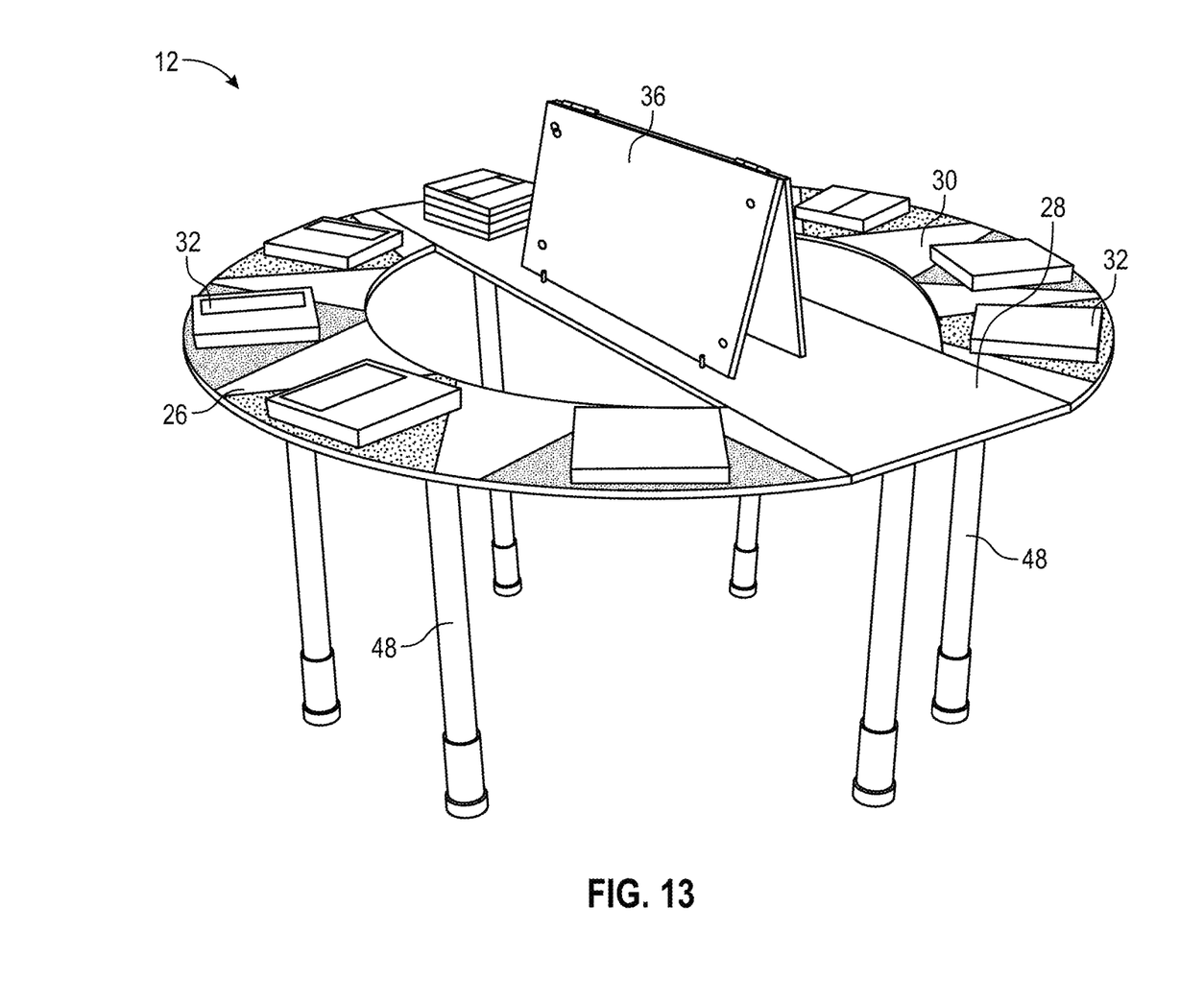

Now referring to FIGS. 11 to 13, the operation of music teaching device 12 is explained. When not in use, hinge plate 36 is folded and placed over second plate 28 such that stoppers 42 insert in holes 40 and retain second plate 28 in position (FIG. 11). Further, legs 48 are removed from each of first plate 26, second plate 28 and third plate 30. In order to assemble music teaching device 12, at first, legs 48 are connected to second plate 28 and second plate 28 is positioned at a height from the ground. Subsequently, first plate 26 and/or third plate 30 are rotated to align with second plate 28. As specified above, first hinges 44 and second hinges 46 help first plate 26 and third plate 30, respectively to rotate or swing towards second side 24. As such, first plate 26 and/or third plate 30 rotate or swing towards second side 24 when not in use. FIG. 11 shows the feature of first plate 26 swinging towards second side 24 while third plate 30 is placed at 180 degrees with respect to second plate 28. It is possible to attach pads 32 to first plate 26 when first plate 26 is swung or rotated at 90 degrees to second plate 28.

In order to place music notes 16 at both sides of hinge plate 36, at first, hinge plate 36 is unfolded and placed in the upright/standing position over second plate 28, as shown in FIG. 12. Here, edges of hinge plate 36 rest against/between stoppers 42 to retain hinge plate 36 in the upright/standing position. Subsequently, first plate 26 is rotated upwards such that first plate 26 comes at 180 degrees with respect to second plate 28, as shown in FIG. 13. Users 14 place one or more pads 32 at each zone 34 depending on the height requirement. In order to adjust the height, a user 14 adds/stacks two or more pads 32. This ensures the height is adjusted for one user without changing the height of the entire plate 20 or music teaching device 12. After installing music teaching device 12, a user 14 places music notes 16 at both sides of hinge plate 36, as shown in FIG. 1, for example. Users 14 views music notes 16 and practices the music by playing/hitting musical instruments 18 on pads 32 for producing sound.

It is understood that the order of FIGS. 11 to 13 is shown for illustrative purposes only and should not be construed in a literal or limited sense. Users 14 may connect plate 20 first and connect legs 48. Subsequently, users 14 may place pads 32 over zones 34. Alternatively, users 14 may place pads 32 over zones 34, connect legs 48 to plate 20 and align plate 20 at 180 degrees. As such, users 14 may install or uninstall various components based on the need or convenience.

Figure 14:
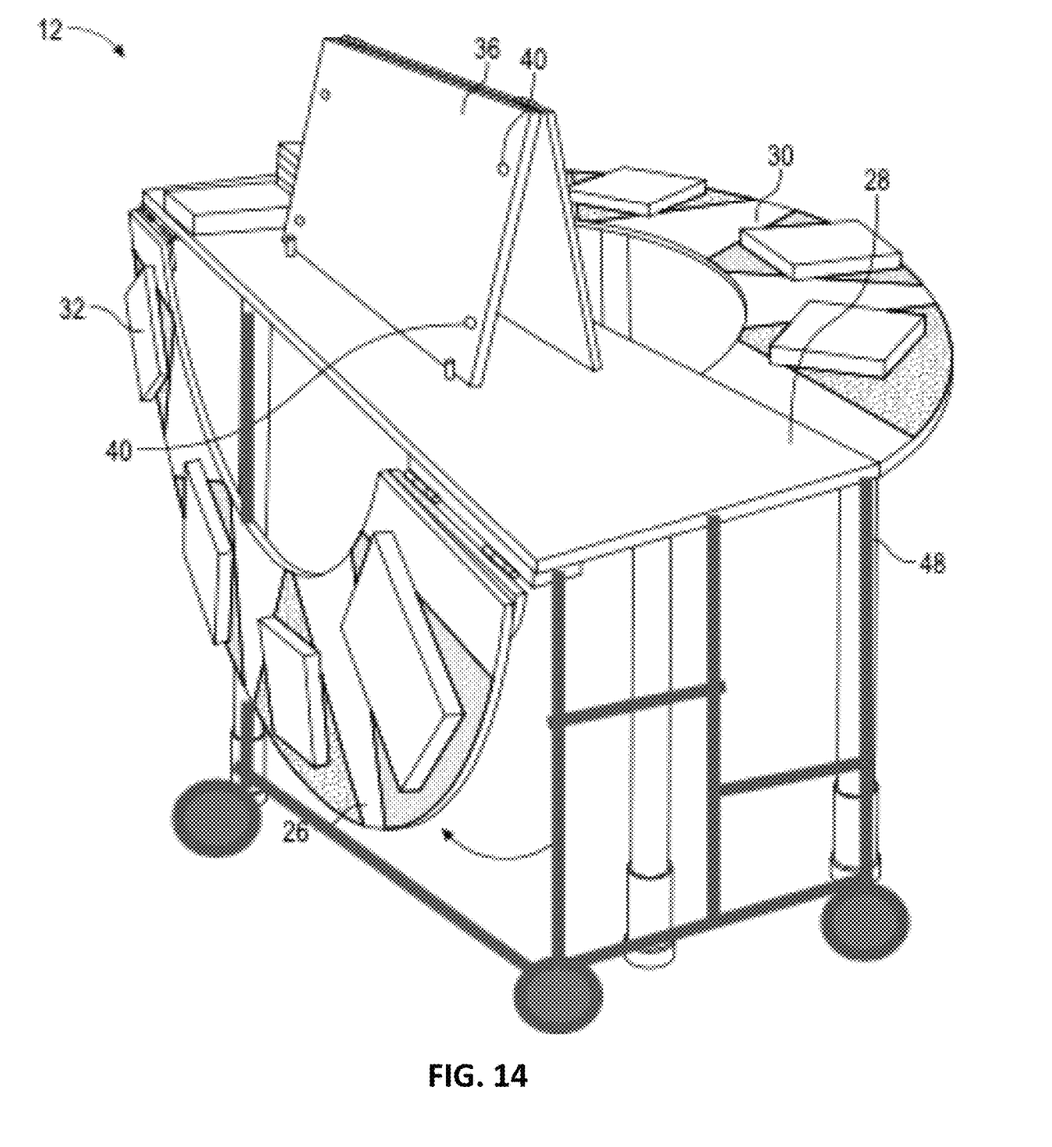
FIG. 14 illustrates an embodiment of the presently disclosed subject matter incorporating a cart or carriage device for enhancing portability.

FIG. 14 illustrates an embodiment of the presently disclosed subject matter incorporating a cart or carriage device for enhancing portability.

Based on the above, it is evident that the presently disclosed music teaching device allows multiple users/students to surround the music teaching device to view the music notes placed at the center to learn or play the music.

A person skilled in the art appreciates that the music teaching device may come in a variety of shapes and sizes depending on the need and comfort of the user. Further, many changes in the design and placement of components may take place without deviating from the scope of the presently disclosed music teaching device.

In the above description, numerous specific details are set forth such as examples of some embodiments, specific components, devices, methods, to provide a thorough understanding of embodiments of the present subject matter. It will be apparent to a person of ordinary skill in the art that these specific details need not be employed, and should not be construed to limit the scope of the subject matter.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

The invention claimed is:

1. A foldable music teaching device comprising:
 a plate, said plate further comprising
  a first plate, and
  a second plate, said second plate comprising in a rectangular configuration and acting as a centre plate of the plate, and
  a third plate;
 wherein each of the first plate and third plate forms a semi-circular configuration and connects at either side of said second plate,
 wherein each of said first plate, said second plate, and said third plate yet further comprising zones for receiving magnetic pads;
 wherein said plate further comprises legs, said legs to help in positioning the plate at a height from a ground level;
 wherein said second plate further comprises a hinge plate for allowing the positioning of music notes over the second plate further wherein a plurality of foldable music teaching device users may stand surrounding the plate for viewing the music notes and use musical instruments for produce sounds by hitting the musical instruments over the magnetic pads.

2. The foldable music teaching device of claim 1, wherein said foldable music teaching device facilitates teaching a plurality of musical instruments, including, but not limited to, a percussion mallet or beater or drum stick or drum mallet.

3. The foldable music teaching device of claim 1, wherein said foldable music teaching device allows multiple users or students to read and play music simultaneously.

4. The foldable music teaching device of claim 1, further comprising plurality of magnetic pads placed at predefined zones marked over each of said first plate and said third plate.

5. The foldable music teaching device of claim 1, wherein said hinge plate is foldable at a hinge and includes holes adjacent to the sides or edges of said hinge plate for positioning said hinge plate in a rectangular configuration.

6. The foldable music teaching device of claim 1, wherein said hinge plate extends and acts as a supporting stand for placing the music notes in view of the users from the sides of said first plate and said third plate.

7. The foldable music teaching device of claim 1, wherein said second plate a plurality of stoppers for indicating ridges that extend from the surface of second plate, said stoppers formed in one of a cylindrical or rectangular or tapered configuration and configured configure to fit within holes adjacent to the sides or edges of said hinge plate.

8. A method for forming a foldable music teaching device comprising the steps of:
forming a plate, said plate further comprising the steps of
forming a first plate, and
a second plate, said second plate comprising in a rectangular forming configuration and acting as a centre plate of the plate, and
forming a third plate;
forming each of the first plate and third plate provides a semi-circular configuration and connects at either side of said second plate,
forming each of said first plate, said second plate, and said third plate yet further comprising zones for receiving magnetic pads;
forming said plate further comprises legs, said legs to help in positioning the plate at a height from a ground level; and
forming said second plate to further provide a hinge plate for allowing the positioning of music notes over the second plate;
further forming said a plurality of foldable music teaching device users may stand surrounding the plate for viewing the music notes and use musical instruments for produce sounds by hitting the musical instruments over the magnetic pads.

9. The method for forming foldable music teaching device of claim 8, further comprising the step of forming said foldable music teaching device to facilitates teaching a plurality of musical instruments, including, but not limited to, a percussion mallet or beater or drum stick or drum mallet.

10. The method for forming foldable music teaching device of claim 8, further comprising the step of forming said foldable music teaching device for allowing multiple users or students to read and play music simultaneously.

11. The method for forming foldable music teaching device of claim 8, further comprising the step of forming said foldable music teaching device for providing plurality of magnetic pads placed at predefined zones marked over each of said first plate and said third plate.

12. The method for forming foldable music teaching device of claim 8, further comprising the step of forming said foldable music teaching device for providing said hinge plate to be foldable at a hinge and include holes adjacent to the sides or edges of said hinge plate for positioning said hinge plate in a rectangular configuration.

13. The method for forming foldable music teaching device of claim 8, further comprising the step of forming said foldable music teaching device said hinge plate extends and acts as a supporting stand for placing the music notes in view of the users from the sides of said first plate and said third plate.

14. The method for forming foldable music teaching device of claim 8, further comprising the step of forming said foldable music teaching device said second plate to provide a plurality of stoppers for indicating ridges that extend from the surface of second plate, said stoppers formed in one of a cylindrical or rectangular or tapered configuration and configured configure to fit within holes adjacent to the sides or edges of said hinge plate.

15. A system for teaching music performance to a plurality of users simultaneously, comprising:
a printed or electronically-presented musical score; and
a foldable music teaching device for receiving and displaying said printed or electronically-presented musical score, said foldable music teaching device comprising:
a plate, said plate further comprising
a first plate, and
a second plate, said second plate comprising in a rectangular configuration and acting as a centre plate of the plate, and
a third plate;
wherein each of the first plate and third plate forms a semi-circular configuration and connects at either side of said second plate,
wherein each of said first plate, said second plate, and said third plate yet further comprising zones for receiving magnetic pads;
wherein said plate further comprises legs, said legs to help in positioning the plate at a height from a ground level;
wherein said second plate further comprises a hinge plate for allowing the positioning of music notes over the second plate further wherein a plurality of foldable music teaching device users may stand surrounding the plate for viewing the music notes and use musical instruments for produce sounds by hitting the musical instruments over the magnetic pads.

16. The system for teaching music performance to a plurality of users simultaneously of claim 15, wherein said foldable music teaching device facilitates teaching a plurality of musical instruments, including, but not limited to, a percussion mallet or beater or drum stick or drum mallet.

17. The system for teaching music performance to a plurality of users simultaneously of claim 15, wherein said foldable music teaching device allows multiple users or students to read and play music simultaneously.

18. The system for teaching music performance to a plurality of users simultaneously of claim 15, further comprising plurality of magnetic pads placed at predefined zones marked over each of said first plate and said third plate.

19. The system for teaching music performance to a plurality of users simultaneously of claim 15, wherein said hinge plate is foldable at a hinge and includes holes adjacent to the sides or edges of said hinge plate for positioning said hinge plate in a rectangular configuration.

20. The system for teaching music performance to a plurality of users simultaneously of claim 15, wherein said hinge plate extends and acts as a supporting stand for placing the music notes in view of the users from the sides of said first plate and said third plate.

\* \* \* \* \*